United States Patent
Renaud

[19]

[11] Patent Number: 6,056,018
[45] Date of Patent: May 2, 2000

[54] VARIABLE STIFFNESS BELLOWS

[75] Inventor: Michel Claude Renaud, Prangins, Switzerland

[73] Assignee: E.I. du Pont de Nemours and Company, Wilmington, Del.

[21] Appl. No.: 08/960,609

[22] Filed: Oct. 29, 1997

[51] Int. Cl.[7] .................................................. F16L 11/00
[52] U.S. Cl. .................. 138/121; 138/177; 138/DIG. 11
[58] Field of Search .................... 138/121, 122, 138/177, 178, DIG. 11

[56] References Cited

U.S. PATENT DOCUMENTS

| | | | |
|---|---|---|---|
| 1,740,524 | 12/1929 | Schmidt | 138/177 |
| 1,813,039 | 3/1931 | Escol | 138/121 X |
| 2,012,766 | 8/1935 | Meyer | 138/121 X |
| 2,157,564 | 5/1939 | Peuthert | 138/121 |
| 2,406,838 | 9/1946 | Kepler | 138/121 X |
| 2,695,038 | 11/1954 | Parce et al. | 138/121 X |
| 4,592,231 | 6/1986 | Kant | 138/121 X |
| 5,439,035 | 8/1995 | Dal Palu úAttillio | 138/121 |
| 5,706,864 | 1/1998 | Pfleger | 138/121 |

FOREIGN PATENT DOCUMENTS

| | | |
|---|---|---|
| 0 368 096 | 10/1989 | European Pat. Off. . |
| 0 791 775 A1 | 2/1996 | European Pat. Off. ......... F16L 11/12 |
| 92 01 997 U | 4/1992 | Germany . |
| 8-210564 | 8/1996 | Japan ................ F16L 9/12 |

*Primary Examiner*—Patrick Brinson

[57] ABSTRACT

A bellows is disclosed which includes a tube having plurality of raised circumferential convolutes formed in the surface of the tube, wherein at least one of the convolutes being formed so that a portion of the convolute is substantially even with the surface of the tube.

6 Claims, 4 Drawing Sheets

VARIABLE STIFFNESS BELLOWS

BACKGROUND

1. Field of the Invention

This invention relates to the field of air ducts, such as are used in the automotive industry.

2. Description of the Related Art

Air ducts are commonly used, for example, in automobiles where the air duct carries air to an engine. The air may pass through a turbocharger, in which case the air flowing through the ducts may be heated to temperatures of up to 180° C., but in general the air is heated to 140–160° C.

These air ducts are often made by different blow molding techniques. Sequential extrusion blow molding technology is used to produce one-piece air ducts that combine several hard and soft segments.

An example of a conventional air duct portion is in FIGS. 1 and 2, where there is shown an air duct 1 having a bellows 3 that includes a first tube 5 having a plurality of convolutes 7 formed therein, and a second tube 9 connected to one end of bellows 3 and a third tube 11 connected to the other end of bellows 3. Convolutes 7 are, essentially, raised circumferential ridges formed in the surface of first tube 5. The soft material segments are generally positions on straight tube portions and are combined with convolutes to allow air duct deflection and decoupling for assembly, engine movements, shock absorption and NVH (noise, vibration and harshness) control. Decoupling means that the air duct is made such that it moves independent of other parts of an engine that the air duct is connected to. The ends of the air duct, which connect the air duct to the engine, are also made with soft materials to increase the flexibility of how the ends may be connected to the engine.

A problem with conventional blow molded air ducts is that because the bellows is made from soft materials, such as thermoplastic ester ether elastomer (TEEE) or flexible polyamide, the bellows tends to elongate too much in the longitudinal, or axial, direction under temperature and pressure.

SUMMARY OF THE INVENTION

A bellows as defined in claim 1.

DETAILED DESCRIPTION

The present invention relates to a bellows which includes a first tube having plurality of raised circumferential convolutes formed in the surface of the first tube, wherein at least one of the convolutes is formed so that a portion of the convolute is substantially even with the surface of the first tube. When the bellows is part of a duct, there is also provided a second tube connected to one end of the bellows and a third tube connected to the other end of the bellows.

The variable stiffness bellows allows the control of the direction or directions in which the bellows bends. Further, the invention controls the longitudinal elongation of the bellows. In fact, the inventive bellows elongates much less in the longitudinal (axial) direction than conventional bellows.

When fluids, such as air or liquids, move under pressure through a duct, the pressure in contact with the projected surface of the duct creates a force which pulls and deforms the bellows. This force generates material stress which leads to material creep over time, and which can make the duct fall out of its design tolerance. The duct may then move undesirably and contact other parts which may damage the duct or the parts it contacts. When used in an engine, the duct may contact hot surfaces and be damaged.

Further, the bellows of the invention allows a duct to be decoupled, that is, it allows the duct to move independently of other parts of an engine. Decoupling prevents or greatly reduces the shear stress on the tube portions connected to the bellows.

Figure 3:
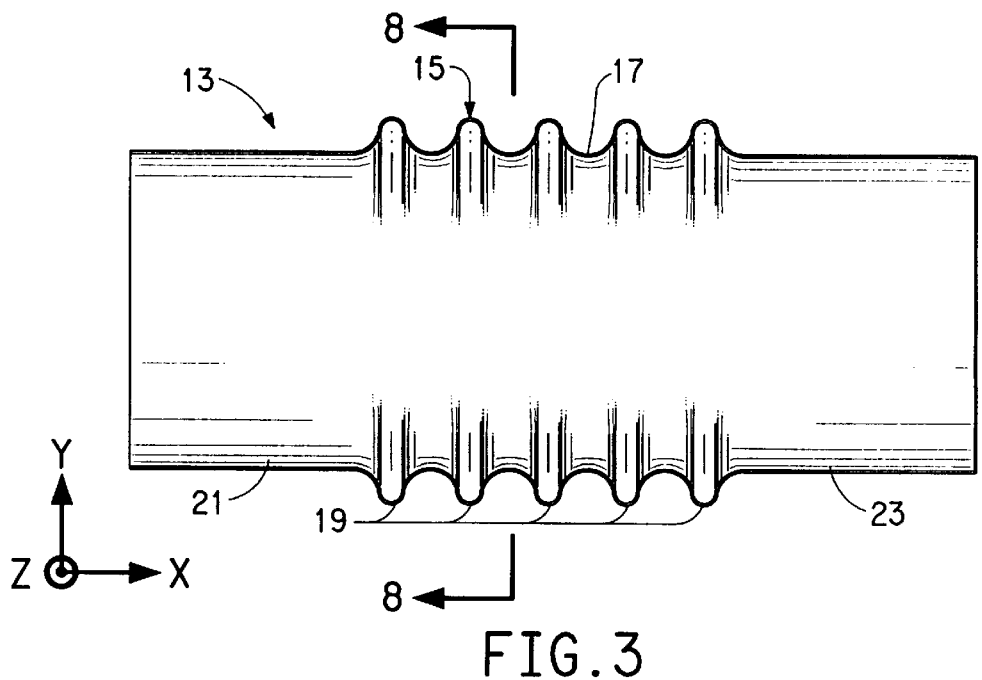
FIG. 3 is a side view in elevation of a duct having a bellows design in accordance with the present invention.
Figure 4:
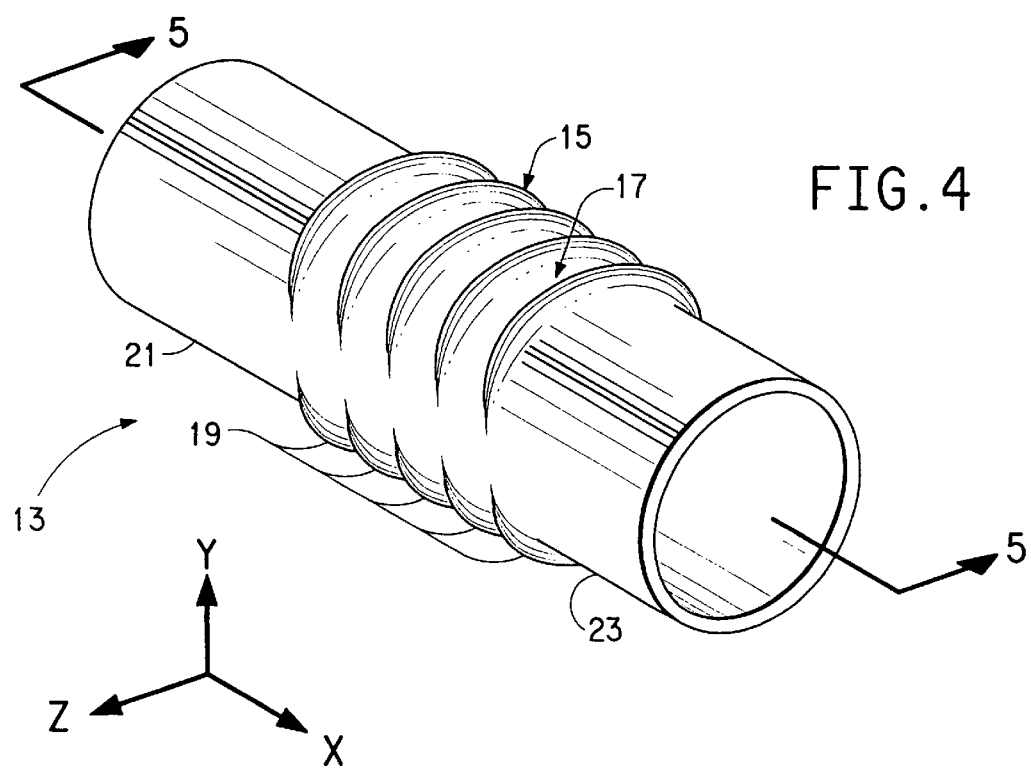
FIG. 4 is a view in perspective of the duct of FIG. 3.

Turning now to the figures, there is shown in FIGS. 3 and 4 a duct 13 having a variable stiffness bellows 15 constructed in accordance with the invention. Bellows 15 includes a first tube 17 having a plurality of convolutes 19 formed therein. Duct 13 includes a bellows 15, a second tube 21 connected to one end of bellows 15 and a third tube 23 connected to the other end of bellows 15.

Figure 5:
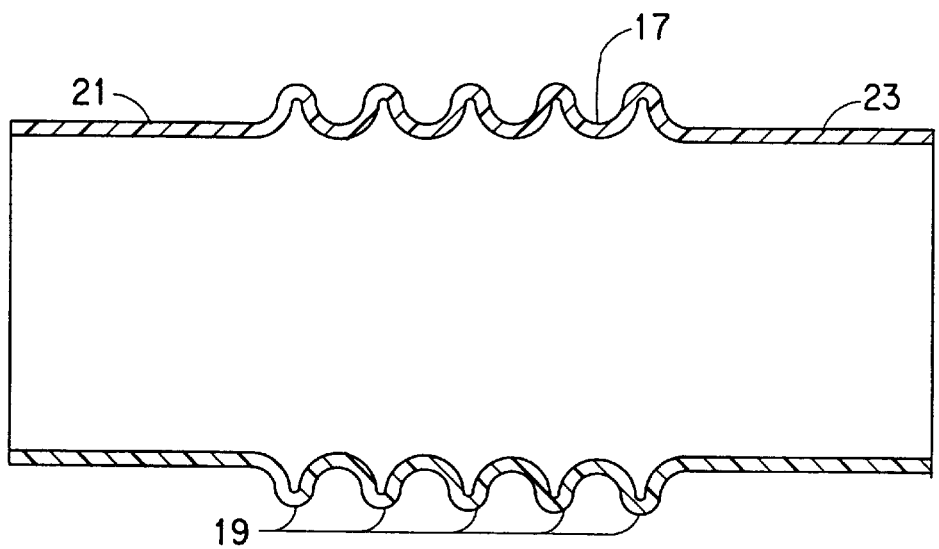
FIG. 5 is a view in cross section of the duct of FIG. 4 taken along the lines 5—5.

As shown in FIG. 5, convolutes 19 are, essentially, raised circumferential ridges formed in the surface of first tube 17. Unlike conventional convolutes 7 shown in FIG. 1, however, convolutes 19 are not formed around the total circumference of first tube 17 but rather at least one of convolutes 19 is formed so that two opposing portions convolute 19 are substantially even with the surface of the first tube 17. In FIG. 3, all of convolutes 19 are formed to have a portion thereof substantially even with the surface of tube 17.

Figure 6:
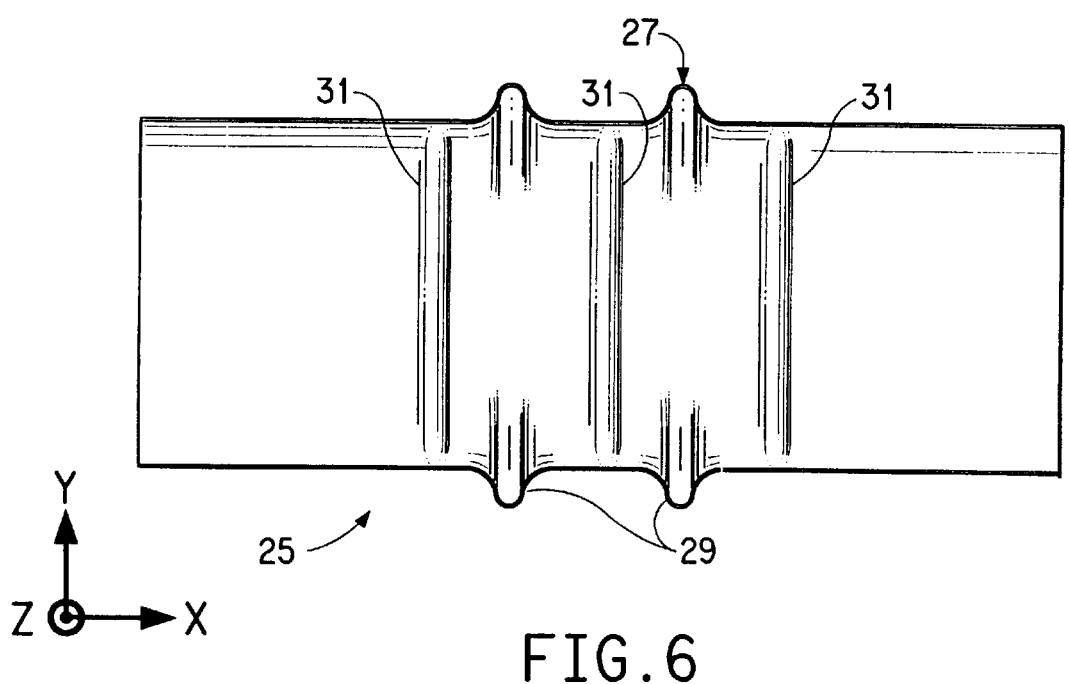
FIG. 6 is a side view in elevation of a duct having a bellows design in accordance with the present invention.
Figure 7:
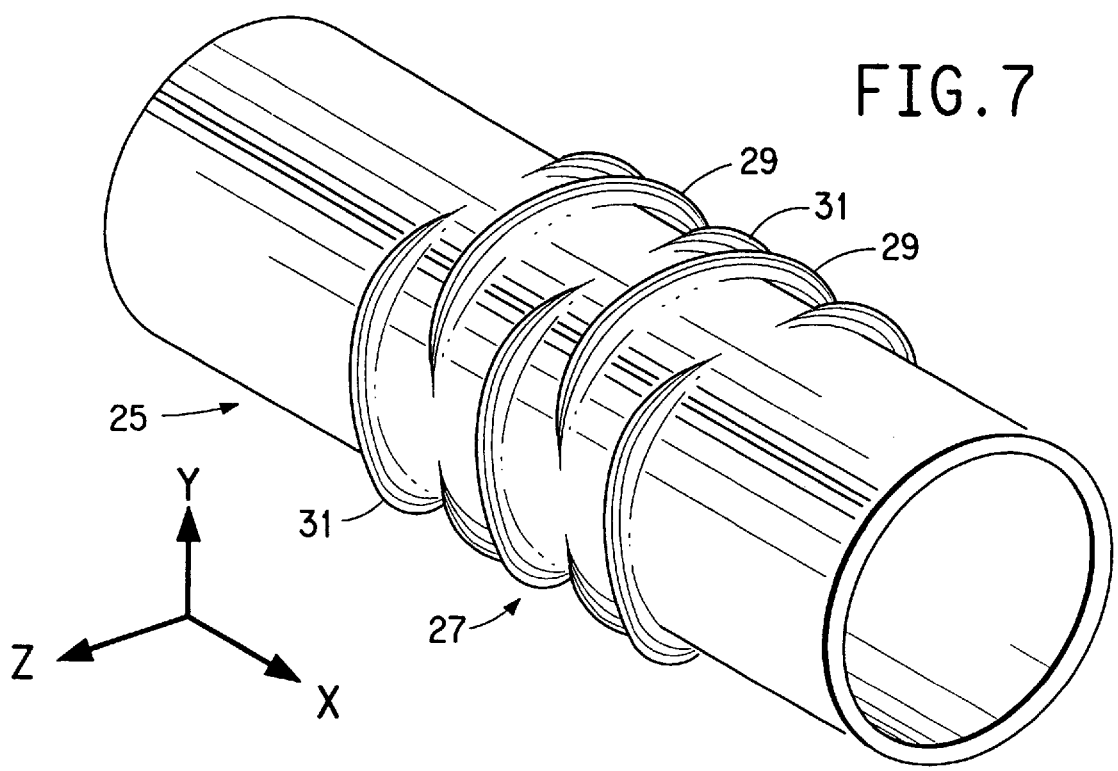
FIG. 7 is a view in perspective of the duct of FIG. 6.

In FIGS. 3 and 4, convolutes 19 are oriented in the same direction, however they need not be. Turning to FIGS. 6 and 7 there is shown a duct 25 having a bellows 27 which includes convolutes 29 formed as in FIG. 3 but which also includes convolutes 31 which have the same shape as convolutes 29 but which are formed at a 90 degree angle from convolutes 29. According to this configuration, the raised portions of convolutes 29 partially overlap with the flattened portions of convolutes 31, and the raised portions of convolutes 31 partially overlap with the flattened portions of convolutes 29. The orientation of the convolutes 29, 31 of bellows 27 controls the stiffness of a duct, and thus the ability of the duct to bend in a given direction.

Bellows 15 in FIG. 3 has two important benefits when compared to conventional prior art bellows 3. First, bellows 15 restricts the longitudinal elongation of duct 13 in the x direction. This improved elongation is the result of the stiffness of flat portions of convolutes 19. Secondly, bellows 15 allows duct 13 to bend in the y direction but restricts duct 13 from bending in the z direction.

Bellows 27 in FIG. 6 is a design that allows duct 25 to bend uniformly in the y and z directions. Further, bellows 27 also limits the longitudinal elongation of duct 25 in the x direction.

Convolutes 19 shown in FIG. 5 have a uniform thickness from the flat portion to the raised portion, but the invention is not so limited. Convolutes 19 may be of non-uniform thickness such as in an oblong shape. The thickness of the first tube 17 may be the same as, or different from, the thickness of second 21 and/or third tube 23.

The height of convolutes 19 above tube 17 is shown to be uniform, but the height of convolutes 19 may vary from convolute to convolute.

Figure 8:
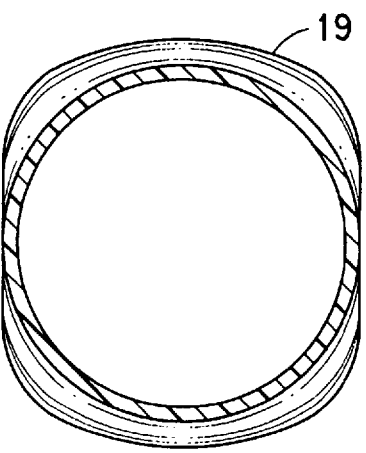
FIG. 8 is a view in cross section of the duct of FIG. 3 taken along the lines 8—8.

Turning to FIG. 8, there is shown a cross sectional view of convolute 19 of FIG. 3. Convolute 29 of FIG. 6 has the same shape as convolute 19 of FIG. 3.

following procedure. The second tube is clamped and is held stationary at its end distant from the bellows, and the third tube is capped closed. An internal pressure of 1.5 bar (at pressure gage) at 120° C. is applied to the whole duct. That is, the pressure is applied into the duct, the second tube, the bellows and the third tube onto the end cap surface. The side of the duct that is end-capped is free to elongate along the x axis.

The ducts are made of TEEE.

The following properties of each of the three ducts are measured: (1) the material strain, in and out of the duct, on the material surface; (2) the material stress; (3) the part deformation, measured in the longitudinal (axial) direction, along the x-axis and (4) the part deformation, measured in the radial direction, along the y-axis and z-axis.

TABLE 1

| Example No. | Maximum Strain - Top Surface (%) | Maximum Strain - Bottom Surface (%) | Maximum Stress - Top Surface (MPa) | Maximum longitudinal elongation (axial), x axis (mm) | Percent reduction in longitudinal elongation (axial), x axis | Maximum deformation radial, y axis (mm) | Maximum deformation radial, z axis (mm) |
| --- | --- | --- | --- | --- | --- | --- | --- |
| Comparative 1 | 11.3 | 10.3 | 4.0 | 15.3 | — | 1.7 | 1.7 |
| 2 | 9.6 | 9.3 | 3.5 | 3.7 | 76 | 2.2 | −1.1 |
| 3 | 10.2 | 11.0 | 3.7 | 7.1 | 54 | 1.8 | 1.7 |

The shape of the convolutes is not critical to the invention. They are illustrated in FIG. 5 as being semicircular, but the invention is not limited to convolutes of that shape. The convolutes may be triangular, rectangular, trapezoidal or any other shape as long as such shape provides the benefits of this invention.

The variable stiffness bellows is not restricted to a specific number of convolutes. The number of convolutes used depends on the use of the bellows, or the use of a duct which includes the bellows.

The term "duct" as used herein is not restrictive, and includes any other fluid conveying means such as a pipe or a hose. Further, while the ducts illustrated in the Figures include one bellows, multiple bellows may be used in one duct depending on design of the duct.

The bellows and duct of this invention are preferably made by blow molding, but the invention is not so limited and they may be made by any conventional means known to those skilled in the art.

If blow molded, the bellows and duct may be made from any blow moldable thermoplastic resin. The term "thermoplastic resin" includes synthetic polyamides, polyesters, polyacetals, block polyester ether copolymers, ethylene propylene diene elastomer (EPDM), olefins such as polypropylene, as well as mixtures or blends thereof.

EXAMPLES

Figure 1:
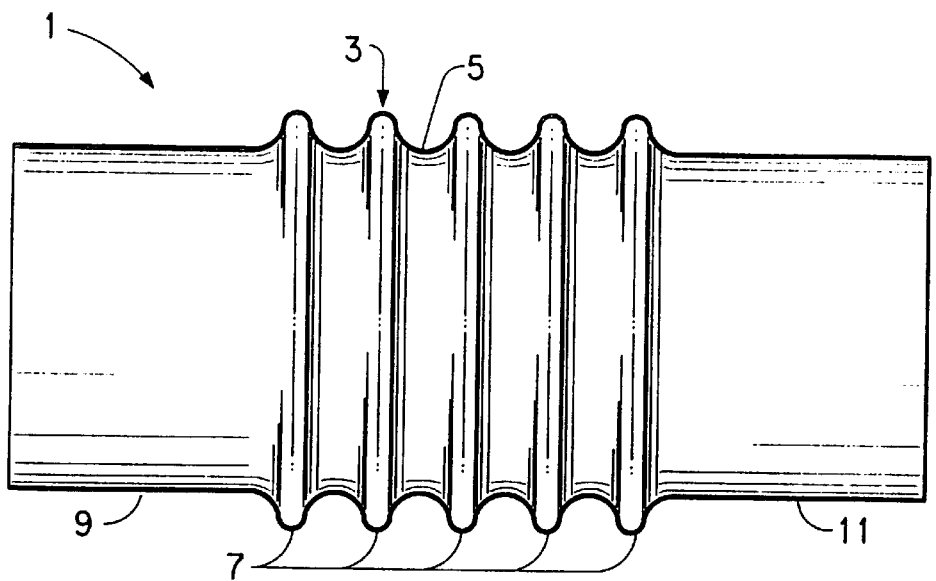
FIG. 1 is a side view in elevation of a duct having a conventional bellows design.
Figure 2:
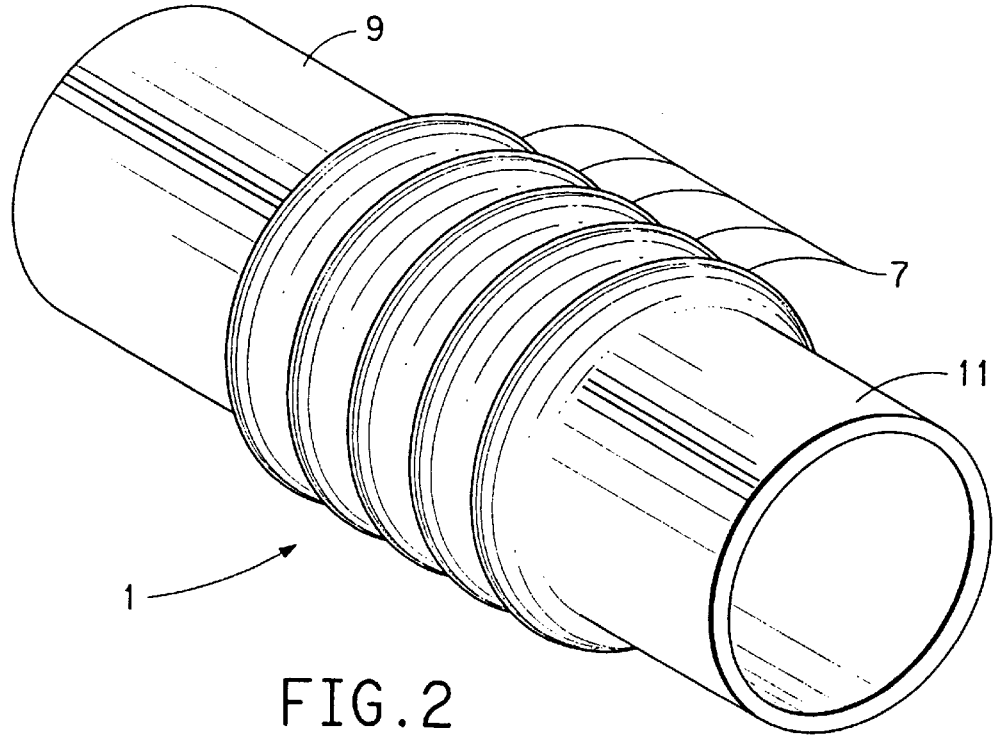
FIG. 2 is a view in perspective of the duct of FIG. 1.

Example 1 is a comparative example using a duct as is shown in FIG. 1; Example 2 is an example of the invention using a duct having the variable stiffness bellows as shown in FIGS. 3 and 4; and Example 3 is an example of the invention using a duct having the variable stiffness bellows as shown in FIGS. 5 and 6.

The wall thickness of the bellows is a uniform and constant 2.0 millimeters, and the wall thickness of the tube portions connected to the bellows is a uniform and constant 3.0 millimeters.

In the following examples, each of the three bellows shown in FIGS. 1, 3 and 6 are evaluated according to the The Examples show the unexpected improvement in the physical characteristics of a duct having a variable stiffness bellows constructed in accordance with this invention.

Specifically, the results of the material strain and material stress for Examples 2 and 3 compare favorably with Comparative Example 1, which shows there is no deterioration in the material of the ducts.

Examples 2 and 3 show a dramatic reduction in the longitudinal elongation of the ducts compared to Comparative Example 1. Example 2 shows a 76% reduction in longitudinal elongation compared to Comparative Example 1, and Example 2 shows a 54% reduction in longitudinal elongation compared to Comparative Example 1.

The deformation in the radial y and z directions of the ducts of Examples 2 and 3 compares favorably to the results of Comparative Example 1. This shows there is no undesirable modification of the duct when subjected to these test conditions.

What is claimed is:

1. A bellows which comprises a tube having plurality of raised circumferential convolutes formed in the surface of the tube, the improvement which comprises at least one of the convolutes being formed so that two opposing portions of the convolute are substantially even with the surface of the tube and two oppposing portions of the convolute extend above the surface of the tube.

2. The bellows of claim 1, wherein the convolutes that have two opposing portions of the convolute substantially even with the surface of the tube and two opposing portions of the convolute extend above the surface of the tube are oriented in the same direction.

3. The bellows of claim 1, wherein the convolutes that have two opposing portions of the convolute substantially even with the surface of the tube and two opposing portions of the convolute extend above the surface of the tube are oriented in different directions.

4. A duct that includes a bellows of claim 1.

5. The bellows of claim 1, wherein the bellows is made of a thermoplastic resin.

6. The bellows of claim 1, wherein said bellows arc formed in a straight section of a tube.

* * * * *